United States Patent [19]
Lund

[11] Patent Number: 5,599,168
[45] Date of Patent: Feb. 4, 1997

[54] WIND TURBINE ADAPTABLE TO WIND DIRECTION AND VELOCITY

[76] Inventor: Arnold M. Lund, 1210 Avocado Ave., Escondido, Calif. 92026

[21] Appl. No.: 518,788

[22] Filed: Aug. 23, 1995

[51] Int. Cl.$^6$ .................................................. B63H 1/06
[52] U.S. Cl. .......................... 416/136; 416/41; 416/135
[58] Field of Search ......................... 416/41, 135, 136, 416/117, 9, 11

[56] References Cited

U.S. PATENT DOCUMENTS

| | | | |
|---|---|---|---|
| 244,677 | 7/1881 | Sherwood | 416/117 |
| 749,806 | 1/1904 | Rue | 416/117 |
| 2,030,953 | 2/1936 | Cemeny | 416/136 |
| 2,052,454 | 8/1936 | Ellwood et al. | 416/136 |
| 2,080,955 | 5/1937 | Watkins | 416/136 |
| 3,580,694 | 5/1971 | Andersen | 416/136 |
| 4,084,921 | 4/1978 | Norz | 416/11 |
| 4,306,838 | 12/1981 | Trainer | 416/135 |
| 4,877,374 | 10/1989 | Burkett | 416/41 |
| 5,137,417 | 8/1992 | Lund | 415/4.1 |
| 5,286,166 | 2/1994 | Steward | 416/136 |

OTHER PUBLICATIONS

The Forecast for Wind Power by: Dawn Stover, Popular Science, Jul. 1995 8 pages total.
Depth of Experience Cost Effective Technology, Complete Windpower Capabilities; Zond © 1994.
TW 600 Tacke Windtechnik Brochure.

*Primary Examiner*—Edward K. Look
*Assistant Examiner*—Mark Sgantzos
*Attorney, Agent, or Firm*—Gene Scott-Patent Law & Venture Group

[57] ABSTRACT

A wind turbine apparatus having a frame assembly consisting of a hub and an outer rim interconnected by a series of spokes. Several wind vanes are rotatably secured within the frame assembly so as to extend from the hub radially outwardly around the frame assembly. Each wind vane consists of an impeller and an impeller shaft, the impeller shaft being positioned so that it does not pass through the center of wind moment of the impeller. Thus, when a wind vector reaches the impeller, the impeller and shaft rotate in direct accordance with the wind's velocity, thus ensuring that the impeller faces optimally into the wind. A biasing device is attached to each impeller shaft, the biasing device serving to retard the rotation of the wind vanes when the wind vector exceeds a given velocity, thus ensuring that the impellers maintain a constant rotational speed. A link means interconnects the adjacent impeller shafts so as to ensure that the wind vanes rotate simultaneously.

10 Claims, 2 Drawing Sheets

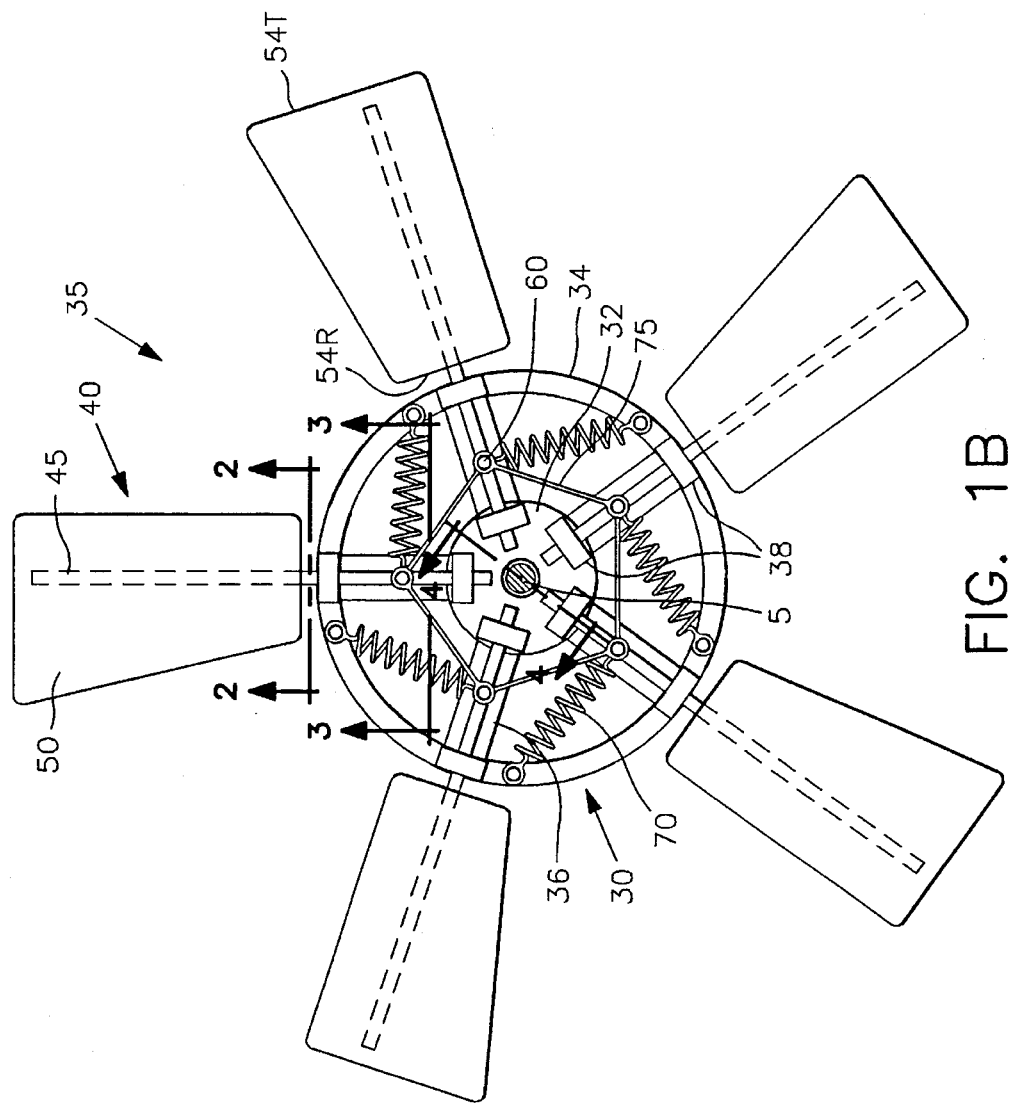
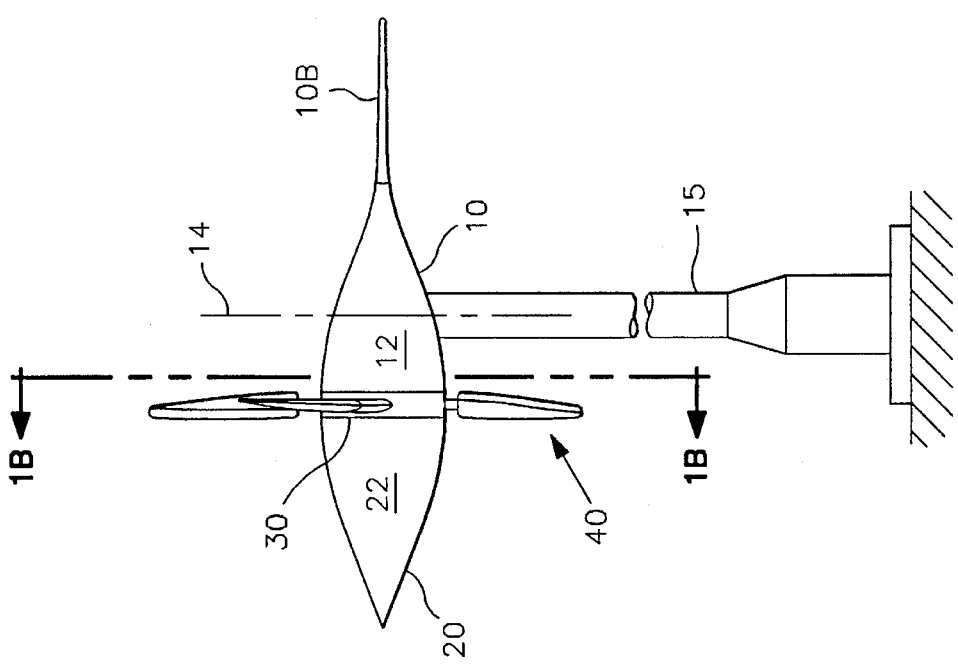
FIG. 1B
FIG. 1A

WIND TURBINE ADAPTABLE TO WIND DIRECTION AND VELOCITY

BACKGROUND OF THE INVENTION

1. Field of the Invention

This invention relates generally to wind turbines, and more particularly to an improved turbine with mechanical means for controlling constant rotation.

2. Description of Related Art

For many decades, oil, gas and coal have been the world's dominate power sources. However, as global warming, ozone depletion, water pollution and many other negative consequences pose more and more of a threat to the planet, we have begun to question our reliance on fossil fuels and search for more sustainable, less damaging alternative power sources. Wind power seems to be a perfect solution, as harnessing the power of the wind does not create any toxic by-products nor does it spew chemicals into the air and water. Most importantly, however, there is an abundant, virtually unlimited supply of wind, as just one percent of the Earth's winds could theoretically meet the entire world's energy needs.

Originally, wind power was only used by farmers and ranchers who where outside of the power grid altogether. However, tax incentives offered in the 1980's led to the introduction of wind power on a somewhat larger scale. Today, there are nearly 17,000 turbines in the United States, and Europe has almost 2,000 megawatts of generating capacity. Although this still accounts for less than 1 percent of the nation's electricity, the use of wind power is rapidly increasing, and the U.S. Dept. of Energy predicts a sixfold increase in the nation's wind-energy use during the next 15 years.

This sudden move toward wind power as a viable power source alternative is due to advanced turbine technology that has dramatically increased the efficiency of turbines and decreased their operational costs to the point that wind power is now economically competitive with fossil fuels and nuclear energy. In fact, it is the goal of the National Renewable Energy Lab to develop wind turbines by the year 2000 that will generate electricity at a cost of four cents per kilowatt-hour as sites with only moderate wind speeds, thus making wind power slightly less expensive than both oil and gas.

One key development that lead to increased efficiency in turbine technology was the creation of airfoils designed specifically for wind turbines. Wind blowing past a turbine does not push the blades, but rather the air passing over the blade's upper surface travels farther than air crossing the underside, thus resulting in a pressure difference that creates lift. As lift drives the blades forward, they turn a drive shaft connected to a generator. Once airfoils based on these principles were designed and installed in conventional turbines, energy capture increased by approximately 30%.

As technology has increased, the size of the turbines has also significantly increased, as the way to capture more energy at lower wind speeds is to use longer blades and taller towers. The largest turbine currently in use is the Z-40 turbine manufactured by Zond Systems of Tehachapi, Calif. This turbine has a three-blade rotor that measures 40 meters in diameter. The rotor is designed to turn at a constant speed so that the turbine consistently cranks out electric current at a 60 Hz frequency. A generator of the device is designed to create drag when needed so as to keep the blades rotating at the correct speed. At sites where average wind speed is 15 to 16 mph, the Z-40 generates electricity for approximately five to six cents per kilowatt-hour.

Unfortunately, while a turbine's power output may increase in proportion to its size, the Z-40 faces many problems due to its extremely large size. First of all, a single turbine costs nearly $500,000 to produce. The blades, rotor hub and nacelle of the device alone weigh approximately 55,000 pounds, the size and weight of the device requiring special shipping procedures to transport it to its on-site location. Even further, because its blades are so long, its pitch-control system cannot immediately respond to wind gusts. To overcome this problem, ailerons that are much shorter than the entire blades are installed on the device so that they can respond faster when wind speed becomes dangerous. However, the use of such ailerons makes the device susceptible to icing and thus makes the turbine unsuitable for use in cold climates.

The problems and cost considerations involved with turbines of such a large size will likely prevent turbines from growing much larger than the Z-40. Instead, technology has shifted from extremely large, heavy-duty turbines to smaller, lightweight devices designed with an emphasis on aerodynamics rather than size. The AWT-26 designed by Advanced Wind Turbines of Seattle is an example of one such turbine apparatus that is currently in use. This device has a rotor diameter of 26.2 meters, has only two blades and has a weight less than one third of that of the Z-40. The turbine spins at 57 rpm, which is about twice as fast as the Z-40. Unlike some three-blade designs, the two blades of this device have a fixed pitch because they don't pivot at the hub. Instead, the blades of the AWT-26 flex as wind speed increases.

Although the AWT-26 improves upon the Z-40 in that it is significantly smaller and less expensive to manufacture, its two blade configuration makes it more susceptible to premature fatigue and damage because wind forces acting on the blades aren't always equal. In addition, with this two-blade configuration, the blades must pass into the tower's "wind shadow" on every rotation. Not only does this fatigue the blades, but it also produces a great deal of noise with each rotation.

Another similar turbine is the Northwind 250 created by New World Power Technology Co. of Moretown, Vt. This device is a 250-kilowatt turbine that also has only two blades. The two fiberglass blades are constructed as a single piece tip to tip with an aluminum clamp fitting over the center of the rotor and a rubber bearing separating the aluminum and fiberglass. This construction effectively eliminates the need for a flange at the root of each blade, which results in approximately 25% savings on the cost of the blade. The Northwind 250 overcomes the noise problem caused by the blades passing into the tower's "wind shadow" on each rotation by yawing the rotor into the wind. Rather than moving the entire blade, the device has a small aileron near the tip of the blades' trailing edge. Unlike the aileron on the Z-40 which is used only for braking, the aileron on this device is simply adjusted to control the pitch of the blade while it is moving. As the aileron is deployed, the lift goes down, the drag goes up and the noise is reduced.

Like the AWT-26, the Northwind 250 uses aerodynamic principles to achieve more efficient operation of the turbine. However, in order to overcome the excessive noise problem associated with a two blade design, this device requires a relatively expensive yaw drive. The Northwind 250, AWT-26 and the Z-40 are all constant-speed machines that must rotate at a fixed speed and thus are incapable of operating during a variety of different wind conditions. There are several different ways by which to monitor the speed of the turbine, but ultimately, when the blade's angle of attack becomes so steep that the airflow around the blades is too turbulent to produce lift, the turbine stalls. The Z-40, for example, shuts down at wind speeds above approximately 65 mph, during light wind conditions and during power outages by feathering its blades and turning them parallel to the wind. The blades of the AWT-26, on the other hand, flex as wind speed increases until they eventually stall. Because the airfoil has a different shape at the blade's root than at its tip, the root section stalls earlier than the tip. While this lets the blade extract the maximum amount of power from the wind before it completely stalls, once the blades stall power can no longer be harnessed.

The KVS-33 turbine having a rotor diameter of 33 meters is produced by Kenetech Windpower of San Francisco and is the first variable-speed machine to be widely accepted by utilities. It is more efficient than comparable constant-speed machines because its rotor speeds up or slows down to match shifts in wind velocity, thus allowing it to generate power in virtually all wind conditions. The device has two generators that produce alternating current with a range of frequencies, rather than the precise 60 Hz demanded by the US power grid. A power-control system converts the fluctuating alternating current to direct current and then inverts it back into 60 Hz alternating current. The turbine's ability to accommodate all wind conditions makes it one of the most efficient turbines currently available. Each individual turbine includes a controller that monitors wind gusts and other conditions and automatically adjusts the turbine according to the monitored conditions. The individual turbine controllers then report to a central computer that keeps track of utility load requirements.

While this device is significantly more effective than prior art constant-speed turbines, its heavy reliance on electronic controls to achieve maximum efficiency make the device susceptible to significant damage in the event of a power outage or malfunction of the controls. Even further, the sophisticated electronic controls installed into each individual turbine significantly add to the cost of manufacturing and operating the device.

Thus there is a clear need for an improved turbine apparatus that can function in a wider range of wind conditions without relying on excessive electronical controls. Such a device would automatically adjust to remain at a constant rotational speed despite changes in wind velocity. The present invention fulfills these needs and provides further related advantages as described in the following summary.

SUMMARY OF THE INVENTION

The present invention is a wind turbine apparatus that significantly improves over prior art devices so as to maximize the turbine's power output and efficiency while minimizing the turbine's constructional and operational costs.

The apparatus consists generally of a disk-shaped frame structure having wind vanes extending radially outwardly from it. A forwardly extending nose cone is positioned over one side of the frame, and a complementary tail cone is positioned over the other side of the frame rearwardly. The entire assembly is pivotally secured to a base tower with the pivotal axis located forward of the net force developed on the wind vanes. This forces the apparatus to maintain an attitude relative to the wind direction that is preferred.

The frame has a diameter significantly larger than the hubs of prior art turbine devices. Each wind vane consists of an elongate shaft with a blade secured at one end. Thus it is an object of the present invention to provide a hub frame having a significantly larger diameter than those of prior art devices so as to provide improved mounting of the wind vanes. Reducing the cost and weight of vane mounting provides a significant advantage, as prior art devices often require over 30 bolts to mount each wind vane to the hub so that it is secure enough to withstand the wind forces on the blades whereas with the present inventive configuration each wind vane requires only two mounting points.

Since the present invention employs a much more stable configuration than prior art devices, the impellers can be made wider at the tip where the wind has more leverage, thus conveying substantially more power to the drive shaft than possible with prior art devices.

With much of the prior art devices, the wind vanes themselves cannot be feathered. Since such configurations do not allow the wind vane to yield to the force of the wind, a great deal of stress is placed on the wind vanes during strong wind conditions, thereby necessitating great structural bulk and more frequent repairs to the vanes. However, with the present inventive configuration, the shaft upon which the impeller is mounted, is off-centered with respect to the wind moment of the impeller blade so that the wind vanes are biased, by the wind, to feather automatically, the shafts being free to rotate in the mounting configuration. Thus, when the wind velocity increases, the vanes simply turn about the shaft axis to a degree in direct correspondence with the wind velocity, thus ensuring that the force on the vanes is more or less, constant.

As mentioned, the present invention optimizes efficiency and improves over prior art devices by automatically controlling the speed of the device. With some of the prior art devices designed to maintain a constant speed, when the wind velocity is too great, the device stalls and produces no power output at all. Prior art devices designed to rotate at varying speeds, on the other hand, generally require complex electronic control in order to orchestrate the varying current produced, making the turbine more expensive to successively operate. The present invention, however, utilizes a spring attached to each vane to automatically maintain each vane impeller at an optimal angle so as to assure constant wind force on the vane. As wind velocity increases, the vane simply is pushed to rotate enough to spill wind. This configuration allows the turbine's speed to be automatically controlled without necessitating sophisticated electronic controls. Additionally, this configuration is advantageous in that, if it is desired to alter the constant rotational speed, a bias means with a different spring constant is simply installed or replaces the former device.

A link means is used to link the wind vanes together so that all of the vanes react to varying wind conditions simultaneously. This automatic feathering causes the turbine to reduce the force on the generators and eventually stall rotation if necessary in order to prevent the generators from overheating in high wind. These features allow the turbine apparatus to operate in all but the most destructive wind conditions.

Finally, the present invention significantly improves over prior art devices by increasing the twist of the impeller beyond what has been experienced in this industry. The twist of the vane tends to displace the wind vector to one side, and since the tip of the vane encounters significantly more volume of air then does the root, a net air flow from tip to root is set-up as the vanes rotate. Therefore, the air pressure adjacent to the vanes increases moving from tip to root. The net result is that the machine can process a greater amount of air then any of the prior art devices of a similar size, and rotating at a similar rotational velocity.

It is important to note that none of the inventive features of the present invention can be implemented within turbine apparatus that are currently in use, as their automatic rotation has to be implemented mechanically and activated with sensors and computers when stalling is desired. The present invention is therefore simpler, less expensive to manufacture, less likely to malfunction, and generates more power than other wind turbines with the same swept area.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention, a wind turbine. In such drawings:

FIG. 1A is a side elevational view of the preferred embodiment of the present invention, and particularly showing a nose and rear cones, a rotating frame with wind vanes, and a tower stand;

FIG. 1B is a cross-sectional view thereof, taken along line 1B—1B of FIG. 1A and particularly showing a disk shaped frame with wind vanes radially mounted, and having bias means for controlling feathering of the vanes, and links for assuring that the degree of feather rotation is identical for all of the vanes;

DETAILED DESCRIPTION OF THE PREFERRED EMBODIMENT

Figure 2:
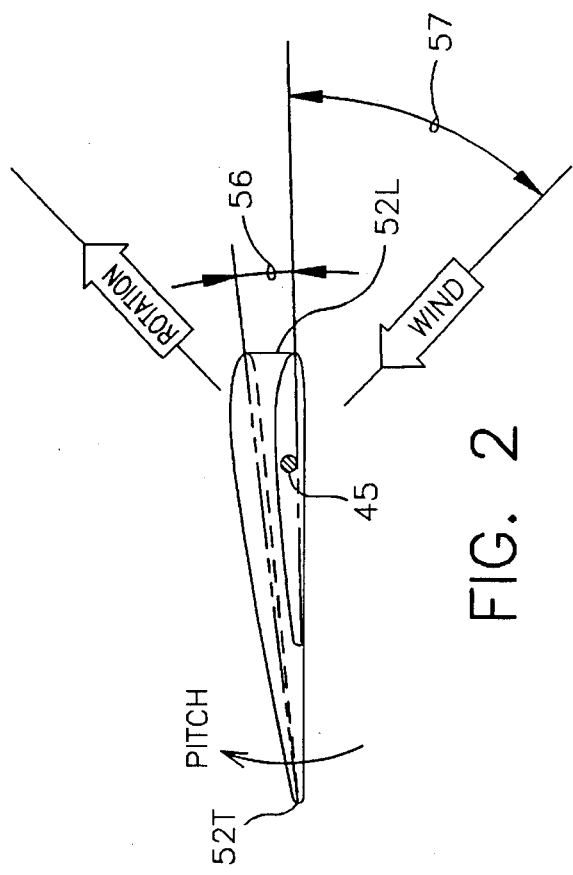
FIG. 2 is a cross-sectional view thereof, taken along line 2—2 of FIG. 1B.
Figure 4:
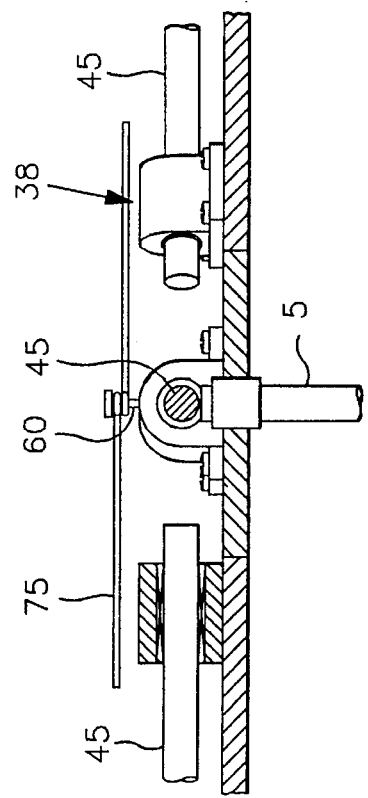
FIG. 4 is a cross-sectional view thereof, taken along line 4—4 of FIG. 1B.
Figure 3:
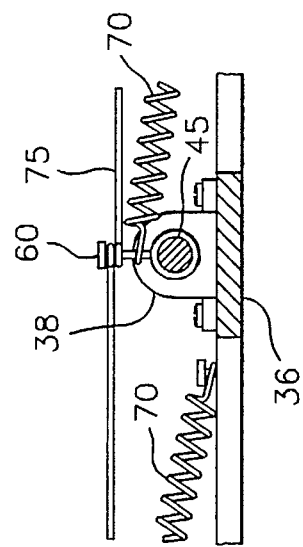
FIG. 3 is a cross-sectional view thereof, taken along line 3—3 of FIG. 1B.

FIGS. 1A, 1B and 2–4 show a preferred embodiment of the present inventive wind turbine apparatus. The wind turbine apparatus has a disk shaped frame assembly 30 that is rotatably mounted upon a horizontal drive shaft 5. A number of wind vanes 40 are engaged with the frame assembly 30, together therewith defining a rotor 35 of the present invention. A rotationally symmetrical and stationary nose cone 10 is positioned concentrically with the drive shaft 5 forward of the rotor 35, while a rotationally symmetrical tail cone 20 is positioned concentrically with the drive shaft 5 to the rear of the rotor 35. The tail cone 20 rotates with the frame assembly. Both cones are configured as modified cones for aerodynamic purposes, with points at respective distal ends and circular openings at the proximal ends, that is, the ends abutting the rotor 35. The cones 10, 20 are shaped so as to assure laminar flow both into and out of the rotor 35. As illustrated in FIG. 1A, an elongate rod 10B preferably extends outwardly from the point of the nose cone 10. The rod 10B not only serves as a lightning rod that prevents damage to the apparatus by conducting lightning to the ground, but it also serves to stabilize the turbine so that when the apparatus tends to rotate due to wind shift the rod tends to resist the position change through simple inertia.

The rod 10B preferably extends considerably beyond the nose cone 10, as the rod's resisting force increases as its length increases.

As illustrated in FIG. 1A, the turbine apparatus, as described above, is preferably rotatably mounted about a vertical rotational axis 14 to a base tower 15. Details of the hardware necessary to provide for the rotational mounting of the wind turbine apparatus upon the base tower are not shown, as they are very well known in the industry and prior art. The turbine apparatus includes an electrical generator unit and power download facilities as well, and these are also not shown, for they are well known in the art.

As clearly seen in FIG. 1B, the disk-shaped frame assembly 30 consists generally of a hub 32 and an outer rim 34, these two parts being secured to one another by a plurality of spokes 36. But the frame assembly 30 can be any other design providing strength and light weight. The frame assembly 30 includes a series of vane mounting means 38 each designed to accept and rotatably support an impeller supporting shaft 45 of the wind vane 40. In one preferred embodiment, best illustrated in FIG. 4, the vane mounting means 38 consists of a series of pillow blocks positioned on both the hub 32 and the outer rim 34. However, there are numerous other possible embodiments of the vane mounting means 38 well known in the art that may also be successfully employed within the scope of the present invention. The important inventive feature here is that the supporting shaft is rotatably mounted and held at two well spaced apart points. This provides a much superior attachment method when compared to the prior art. It is light in weight, strong and provides for vane rotation.

Each wind vane 40 consists generally of the impeller supporting shaft 45 and an impeller 50. As illustrated in FIG. 1A, each of the impeller supporting shafts 45 are rotatably captured within one of the vane mounting means 38 in such a way that the vanes 40 extend radially around the frame assembly 30. The impeller 50, which is integrally secured to the supporting shaft 45, is positioned in close proximity to the outer rim 34 of the frame assembly 30 but does not contact it. The impeller supporting shaft 45 does not pass through the center of wind force on the impeller 50. Therefore a rotational force is exerted upon the wind vane 40 whenever a wind imposes upon the impellers 50.

The impellers preferably have a length approximately equal to half the diameter of the nose cone 10. Each impeller has a trailing edge 52T and a leading edge 52L which is designed to move in the rotational direction at a nominal angle 57 of approximately 55° degrees with the wind vector, as best seen in FIG. 2. When the wind velocity increases, the impeller pitches accordingly in the direction shown in FIG. 2, thus reducing the angle 57 at which the wind vector contacts the leading edge 52L of the impeller. As illustrated, the wind vanes 40 always rotate in a direction perpendicular to that of the wind vector. A root chord 54R joins the leading 52L and trailing 52T edges of the impeller 50 at a point closest to the outer rim 34, and a tip chord 54T joins the leading and trailing edges of the impeller at the end furthest from the outer rim 34, the distance between the two chords 54T and 54R thus defining the length of the impeller 50. As clearly seen in FIG. 2, the tip chord 54T is greater in length than the root chord 54R, and the two chords are offset from one another so as to define an angle 56 between them. In order to provide a smooth and continuous transition between the offset chords, the impeller 50 is twisted as a smooth transition along its length. In prior art configurations, the root chord generally faces approximately 20° into the wind, while the tip chord generally faces approximately 10° into the wind, thus defining a 10° angle between them. However, the present inventive configuration preferably places the root chord 54R at approximately 30° into the wind and the tip chord 54T at approximately 10° into the wind, thus defining an angle 56 between them of approximately 20°. This angle of 20° has been found, though extensive testing and research, to be highly advantageous to the improved performance of a wind driven machine. During rotation, the tip of each impeller cuts the air, and because of the twist of 20 degrees, protrudes laterally with respect to the root. The air in contact with the forward facing surface of the impeller is therefore drawn downwardly toward the hub and slightly compressed in so moving. This results in a light pressure at the tip of each impeller, which tends to draw more air into the rotor generally. In this way, the rotor of the present invention is able to process a greater volume of air when compared to a similar sized machine of conventional design and having the same swept area. This has been found to result in considerably greater driving power than possible with conventional machines with the same rotor diameter in similar prevailing wind velocities.

A lever arm 60 extends laterally from each impeller supporting shaft 45. Each wind vane 40 includes a bias means 70, such as a spring, that is secured to both the lever arm 60 and the outer rim 34 of the frame assembly 30, preferably in the manner illustrated in FIG. 1B. A plurality of link means 75, preferably rods or the like, are also preferably included with the apparatus, each link means 75 extending between and loosely interconnecting the lever arms 60 of each pair of adjacent wind vanes 40.

Thus, in use, the rotor 35 revolves about the drive shaft 45. The apparatus pivots about the base tower so that the leading edge 52L of the impellers 50 face at a preferred angle with respect to the wind vector. The nose cone 10 has a nose cone outer surface 12 contoured to provide laminar wind flow into the impellers 50, while the tail cone 20 has a tail cone outer surface 22 contoured to assure laminar wind trailing. Since each of the impeller supporting shafts 45 does not pass through the center of wind force of the respective impeller 50, the force of the wind vector against the impellers 50 causes the wind vane supporting shafts 45 to rotate in the vane mounting means 38 with a rotational force directly proportional to the velocity of the wind vector. This provides a constant rotational force on the rotor 35. The link means 75 is designed to ensure that all of the impellers rotate simultaneously to the preferred angle of attack, thus keeping the force exerted on each impeller uniform. This automatic feathering causes the turbine to reduce the force on the generators and eventually zero-out the rotation force if necessary to prevent the generator from overheating in high wind.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A wind turbine apparatus comprising:
   a plurality of wind vanes, each of the vanes including an impeller and an impeller supporting shaft, the impeller and shaft being mutually integrally interconnected and further including a lever arm rigidly extending at a right angle from the supporting shaft;

a frame assembly rotatably mounted upon a drive shaft, the assembly providing vane mounting means for supporting the wind vanes in radial positions around the assembly, each of the impeller supporting shafts axially rotatable within the vane mounting means;

bias means for urging the impellers of the wind vanes into a preferred common angle of attack with respect to a wind vector in order to assume a constant rotational velocity of the turbine;

link means providing elongate rods, each one of the rods interconnecting the lever arms between two of the wind vanes, constraining the impellers to simultaneous rotation and to assume a common said preferred angle of attack.

2. The apparatus of claim 1 wherein for each of the wind vanes, the impeller supporting shaft does not pass through the center of the wind force of the impeller, so that the wind vane supporting shafts tend to rotate in the vane mounting means with the rotational force directly proportional to the velocity of the wind vector, the bias means interconnected with the supporting shafts so as to counteract the wind force.

3. The apparatus of claim 2 wherein the tip and root chords define an angle therebetween, the impeller being twisted for forming a continuous and smooth transition between the chords.

4. The apparatus of claim 3 wherein the angle between the tip and root chords is approximately 20 degrees, the tip chord forming an angle with the wind vector of approximately 30 degrees, the root chord forming an angle with the wind vector of approximately 10 degrees.

5. The apparatus of claim 3 further including a rotationally symmetrical nose cone positioned concentrically with the drive shaft and having a nose cone outer surface contoured to force the wind vector into the impellers.

6. The apparatus of claim 5 further including a rotationally symmetrical tail cone positioned concentrically with the drive shaft and having a tail cone outer surface contoured to provide a smooth transition to the wind vector leaving the impellers.

7. The apparatus of claim 6 wherein both the nose cone and the tail cone have a length respectively, approximately equal to one-half of the distance between the root and tip chords of each of the impellers.

8. The apparatus of claim 7 wherein the nose cone is cone shaped with a point at one end of the nose cone, and conforming to a circular shape of the frame assembly at the other end of the nose cone.

9. The apparatus of claim 7 wherein the tail cone is cone shaped with a point at one end of the tail cone, and conforming to a circular shape of the frame assembly at the other end of the tail cone.

10. The apparatus of claim 5 further including a forwardly projecting rod extending from the point at the one end of the nose cone, the rod longitudinally colinear with the axis of rotation of the rotor.

\* \* \* \* \*